United States Patent
Zhang et al.

(10) Patent No.: US 10,284,754 B2
(45) Date of Patent: May 7, 2019

(54) CAMERA ASSEMBLY CONFIGURED TO BE DETACHABLY MOUNTED ON A MOBILE TERMINAL

(71) Applicant: Huawei Technologies Co., Ltd., Shenzhen (CN)

(72) Inventors: Huimin Zhang, Shenzhen (CN); Xuelong Liu, Shenzhen (CN); Haitao Duan, Shenzhen (CN); Dahai Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/326,200

(22) PCT Filed: Jul. 15, 2014

(86) PCT No.: PCT/CN2014/082267
§ 371 (c)(1),
(2) Date: Jan. 13, 2017

(87) PCT Pub. No.: WO2016/008107
PCT Pub. Date: Jan. 21, 2016

(65) Prior Publication Data
US 2017/0208226 A1    Jul. 20, 2017

(51) Int. Cl.
*H04M 1/02*    (2006.01)
*H04N 5/225*    (2006.01)

(52) U.S. Cl.
CPC ............ *H04N 5/2252* (2013.01); *H04M 1/02* (2013.01); *H04M 1/0254* (2013.01);
(Continued)

(58) Field of Classification Search
CPC . H04N 5/2252; H04N 5/2253; H04M 1/0264; H04M 1/0254; H04M 2250/00; H04M 2250/20
See application file for complete search history.

(56) References Cited

U.S. PATENT DOCUMENTS 6,731,952 B2    5/2004    Schaeffer et al.
7,364,126 B2 *  4/2008    Tsai ................... H05K 5/0234
                                                      248/188.8
(Continued)

FOREIGN PATENT DOCUMENTS

CN    201528368 U    7/2010
CN    202353661 U    7/2012
(Continued)

OTHER PUBLICATIONS

U.S. Appl. No. 61/876,709, filed Sep. 2013, Lee.*

*Primary Examiner* — Twyler L Haskins
*Assistant Examiner* — Akshay Trehan
(74) *Attorney, Agent, or Firm* — Slater Matsil, LLP

(57) ABSTRACT

Embodiments provide a camera assembly, which is configured to be detachably mounted on a mobile terminal body. The camera assembly includes a housing, a photographing unit, and a mounting kit, where the photographing unit is disposed in the housing and is configured to capture a picture and transmit the captured picture to the mobile terminal body, and the mounting kit is disposed on the housing and is configured to be detachably mounted on the mobile terminal body, so as to detachably mount the camera assembly to the mobile terminal body.

11 Claims, 4 Drawing Sheets

(52) U.S. Cl.
 CPC ....... *H04M 1/0256* (2013.01); *H04M 1/0264* (2013.01); *H04N 5/2253* (2013.01)

(56) References Cited

U.S. PATENT DOCUMENTS

| | | | |
|---|---|---|---|
| 7,681,859 B2* | 3/2010 | Kim | F16C 11/10 248/351 |
| 7,957,765 B1* | 6/2011 | Causey | H04M 1/0256 455/550.1 |
| 2006/0014563 A1* | 1/2006 | Cheng | H04M 1/0254 455/557 |
| 2007/0122141 A1 | 5/2007 | Agevik et al. | |
| 2007/0218723 A1 | 9/2007 | Kim | |
| 2009/0176527 A1 | 7/2009 | Ke et al. | |
| 2010/0084529 A1 | 4/2010 | Depay et al. | |
| 2010/0133414 A1* | 6/2010 | Lee | H04M 1/0297 248/686 |
| 2010/0208434 A1 | 8/2010 | Kim et al. | |
| 2014/0092299 A1* | 4/2014 | Phillips | H04N 5/2252 348/376 |
| 2015/0070575 A1* | 3/2015 | Lee | G03B 17/04 348/373 |
| 2015/0156898 A1* | 6/2015 | Shin | H04M 1/0256 361/679.02 |
| 2016/0006920 A1* | 1/2016 | Gomes Da Motta | H04N 5/23203 348/207.11 |
| 2016/0361640 A1* | 12/2016 | Iwao | A63F 13/23 |
| 2017/0171371 A1* | 6/2017 | Jannard | H04M 1/0264 |
| 2017/0366215 A1* | 12/2017 | Scott | H04B 1/3888 |

FOREIGN PATENT DOCUMENTS

| | | |
|---|---|---|
| CN | 203368594 U | 12/2013 |
| CN | 203399151 U | 1/2014 |
| CN | 103595836 A | 2/2014 |
| CN | 103685953 A | 3/2014 |
| CN | 203661112 U | 6/2014 |
| JP | H1124162 A | 1/1999 |
| JP | 2000253118 A | 9/2000 |
| JP | 2002135392 A | 5/2002 |
| JP | 2002335434 A | 11/2002 |
| JP | 2006251217 A | 9/2006 |
| WO | 2012058641 A2 | 5/2012 |

* cited by examiner

CAMERA ASSEMBLY CONFIGURED TO BE DETACHABLY MOUNTED ON A MOBILE TERMINAL

CROSS-REFERENCE TO RELATED APPLICATIONS

This application is a national stage of International Application No. PCT/CN2014/082267, filed on Jul. 15, 2014, which is hereby incorporated by reference in its entirety.

TECHNICAL FIELD

The present invention relates to the field of communications technologies, and in particular, to a mobile terminal and a camera assembly of the mobile terminal.

BACKGROUND

With the advancement of science and technology, more mobile terminals (for example, smartphones) are provided with cameras to implement a photographing function. As a photographing capability of a mobile terminal is constantly enhanced, and it is convenient to take a photo with a mobile terminal, people use a mobile terminal to take a photo more frequently. Currently, a camera on a mobile terminal is fastened to the mobile terminal. During selfie taking, a mobile terminal needs to be held with a hand and a camera is made to face oneself to take a photo. However, in this manner of holding a mobile terminal with a hand to implement selfie taking, both a photographing scenario and a shooting angle are greatly limited.

SUMMARY

A technical problem that embodiments of the present invention attempt to resolve is to provide a mobile terminal and a camera assembly of the mobile terminal, so as to improve convenience and flexibility of photo taking, thereby resolving a problem that a photographing scenario and a shooting angle are limited.

According to a first aspect, a camera assembly is provided, which is configured to be detachably mounted on a mobile terminal body. The camera assembly includes a housing, a photographing unit, and a mounting kit. The photographing unit is disposed in the housing and is configured to capture a picture and transmit the captured picture to the mobile terminal body, and the mounting kit is disposed on the housing and is configured to be detachably mounted on the mobile terminal body, so as to detachably mount the camera assembly to the mobile terminal body.

In a first possible implementation manner of the first aspect, the camera assembly further includes a support, and the support is disposed on the housing in a rotatably positioned manner, so as to support the housing and change, by rotating the support, a direction in which and a position at which the camera assembly is supported.

With reference to the first possible implementation manner of the first aspect, in a second possible implementation manner, the support includes a rotating shaft and a support kit, the support kit is disposed on the rotating shaft in a rotatably positioned manner, the housing is provided with an opening and an accommodating groove connected to the opening, two ends of the rotating shaft are fastened to opposite inner walls of the opening, and the support kit is rotatable to be accommodated in or separated from the accommodating groove.

With reference to the second possible implementation manner of the first aspect, in a third possible implementation manner, the camera assembly further includes an elastic kit and a clamping kit, and the clamping kit is disposed on the housing by using the elastic kit, so as to clamp a to-be-clamped object between the clamping kit and the housing.

With reference to the third possible implementation manner of the first aspect, in a fourth possible implementation manner, the elastic kit and the clamping kit are both disposed on the support kit, a first end of the support kit is sleeved on the rotating shaft in a rotatably positioned manner, a first end of the clamping kit is connected to a second end of the support kit by means of the elastic kit in a rotatable manner, and a second end of the clamping kit is in conformal contact with the support kit; and when a force is applied to the first end of the clamping kit, the second end of the clamping kit moves in a direction far away from the support kit, the elastic kit is deformed and generates a restoring force, and first clamping space is formed between the second end of the clamping kit and the support kit, so as to accommodate the to-be-clamped object; and when application of a force to the first end of the clamping kit ends, the second end of the clamping kit moves towards the support kit under the action of the restoring force, so that the to-be-clamped object is clamped between the support kit and the clamping kit.

With reference to the fourth possible implementation manner of the first aspect, in a fifth possible implementation manner, the elastic kit is a rotary spring, a first surface, which faces the clamping kit, of the second end of the support kit is provided with a fastening groove, the rotary spring is fastened in the fastening groove, a first end of the rotary spring abuts on an inner wall of the fastening groove, a second end of the rotary spring is fastened to the first end of the clamping kit, when the rotary spring is in a natural state, the second end of the clamping kit is in conformal contact with the first surface of the support kit, and when the first clamping space is formed between the second end of the clamping kit and the support kit, the rotary spring is in an elastically deformed state and has a restoring force.

With reference to the fourth possible implementation manner of the first aspect, in a sixth possible implementation manner, a bottom surface, which faces the support kit, of the second end of the clamping kit is provided with a reinforcement portion, a surface, which faces the clamping kit, of the support kit is provided with a groove, to correspond to the reinforcement portion, and when the second end of the clamping kit is in conformal contact with the support kit, the reinforcement portion is accommodated in the groove.

With reference to the third possible implementation manner of the first aspect, in a seventh possible implementation manner, the accommodating groove includes a first accommodation groove and a second accommodation groove, and the opening, the first accommodation groove, and the second accommodation groove are sequentially go-through; the support kit is accommodated in the first accommodation groove, a first end of the elastic kit is fastened to a first end, far away from the opening, of the second accommodation groove, a second end of the elastic kit is connected to the first end of the clamping kit, and the second end of the clamping kit is located at a second end, close to the opening, of the second accommodation groove; and when the elastic kit is in a natural state, the clamping kit is accommodated in the second accommodation groove, when a force is applied to the first end of the clamping kit, the second end of the clamping kit moves in a direction far away from the second accommodation groove, the elastic kit is deformed and generates a restoring force, and second clamping space is formed between the second end of the clamping kit and the housing, so as to accommodate the to-be-clamped object, and when application of a force to the first end of the clamping kit ends, the second end of the clamping kit folds towards the second accommodation groove under the action of the restoring force, so that the to-be-clamped object is clamped between the housing and the clamping kit.

With reference to the seventh possible implementation manner of the first aspect, in an eighth possible implementation manner, the opening is disposed on an end portion of the housing; and when the support kit and the clamping kit are accommodated respectively in the first accommodation groove and the second accommodation groove, a first surface, far away from a bottom of the first accommodation groove, of the support kit and a top surface, far away from a bottom of the second accommodation groove, of the clamping kit are in a same horizontal plane, and are in a same horizontal plane as a surface of a wall of the housing in which the first and second accommodation grooves are located.

With reference to the seventh possible implementation manner of the first aspect, in a ninth possible implementation manner, the second end of the clamping kit is provided with a lifting slot, so as to lift the clamping kit by using the lifting slot.

In a tenth possible implementation manner of the first aspect, the housing includes a bottom wall, a top wall, and a side wall connecting the top wall and the bottom wall, and the top wall, the bottom wall, and the side wall enclose to form accommodation space; the photographing unit includes a camera, a processor, and a transmission unit, the camera is disposed on the side wall, so as to capture a picture, the processor is disposed in the accommodation space, so as to process the captured picture, and the transmission unit is disposed in the accommodation space, so as to output the processed picture to the mobile terminal body; the first mounting kit is disposed on an outer surface of the bottom wall, so as to be detachably mounted on the mobile terminal body; and the support is disposed on the side wall and is disposed opposite to the camera.

In an eleventh possible implementation manner of the first aspect, the mounting kit is symmetrical with respect to a central axis of the camera assembly.

According to a second aspect, a mobile terminal is provided, including a mobile terminal body and a camera assembly that is detachably disposed on the mobile terminal. The camera assembly includes a housing, a photographing unit, and a first mounting kit. The photographing unit is disposed in the housing and is configured to capture a picture and transmit the captured picture to the mobile terminal body. The first mounting kit is disposed on the housing and is configured to be detachably mounted on the mobile terminal body, so as to detachably mount the camera assembly to the mobile terminal body.

In a first possible implementation manner of the second aspect, the mobile terminal further includes a support, and the support is disposed on the housing in a rotatably positioned manner, so as to support the housing and change, by rotating the support, a direction in which and a position at which the camera assembly is supported.

With reference to the first possible implementation manner of the second aspect, in a second possible implementation manner, the support includes a rotating shaft and a support kit, the support kit is disposed on the rotating shaft in a rotatably positioned manner, the housing is provided with an opening and an accommodating groove connected to the opening, two ends of the rotating shaft are fastened to opposite inner walls of the opening, and the support kit is rotatable to be accommodated in or separated from the accommodating groove.

With reference to the second possible implementation manner of the second aspect, in a third possible implementation manner, the camera assembly further includes an elastic kit and a clamping kit, and the clamping kit is disposed on the housing by using the elastic kit, so as to clamp a to-be-clamped object between the clamping kit and the housing.

With reference to the third possible implementation manner of the second aspect, in a fourth possible implementation manner, the elastic kit and the clamping kit are both disposed on the support kit, a first end of the support kit is sleeved on the rotating shaft in a rotatably positioned manner, a first end of the clamping kit is connected to a second end of the support kit by means of the elastic kit in a rotatable manner, and a second end of the clamping kit is in conformal contact with the support kit; and when a force is applied to the first end of the clamping kit, the second end of the clamping kit moves in a direction far away from the support kit, the elastic kit is deformed and generates a restoring force, and first clamping space is formed between the second end of the clamping kit and the support kit, so as to accommodate the to-be-clamped object; and when application of a force to the first end of the clamping kit ends, the second end of the clamping kit moves towards the support kit under the action of the restoring force, so that the to-be-clamped object is clamped between the support kit and the clamping kit.

With reference to the fourth possible implementation manner of the second aspect, in a fifth possible implementation manner, the elastic kit is a rotary spring, a first surface, which faces the clamping kit, of the second end of the support kit is provided with a fastening groove, the rotary spring is fastened in the fastening groove, a first end of the rotary spring abuts on an inner wall of the fastening groove, a second end of the rotary spring is fastened to the first end of the clamping kit, when the rotary spring is in a natural state, the second end of the clamping kit is in conformal contact with the first surface of the support kit, and when the first clamping space is formed between the second end of the clamping kit and the support kit, the rotary spring is in an elastically deformed state and has a restoring force.

With reference to the fourth possible implementation manner of the second aspect, in a sixth possible implementation manner, a bottom surface, which faces the support kit, of the second end of the clamping kit is provided with a reinforcement portion, a surface, which faces the clamping kit, of the support kit is provided with a groove, to correspond to the reinforcement portion, and when the second end of the clamping kit is in conformal contact with the support kit, the reinforcement portion is accommodated in the groove.

With reference to the third possible implementation manner of the second aspect, in a seventh possible implementation manner, the accommodating groove includes a first accommodation groove and a second accommodation groove, and the opening, the first accommodation groove, and the second accommodation groove are sequentially go-through; the support kit is accommodated in the first accommodation groove, a first end of the elastic kit is fastened to a first end, far away from the opening, of the second accommodation groove, a second end of the elastic kit is connected to the first end of the clamping kit, and the second end of the clamping kit is located at a second end, close to the opening, of the second accommodation groove; and when the elastic kit is in a natural state, the clamping kit is accommodated in the second accommodation groove, when a force is applied to the first end of the clamping kit, the second end of the clamping kit moves in a direction far away from the second accommodation groove, the elastic kit is deformed and generates a restoring force, and second clamping space is formed between the second end of the clamping kit and the housing, so as to accommodate the to-be-clamped object, and when application of a force to the first end of the clamping kit ends, the second end of the clamping kit folds towards the second accommodation groove under the action of the restoring force, so that the to-be-clamped object is clamped between the housing and the clamping kit.

With reference to the seventh possible implementation manner of the second aspect, in an eighth possible implementation manner, the opening is disposed on an end portion of the housing; and when the support kit and the clamping kit are accommodated respectively in the first accommodation groove and the second accommodation groove, a first surface, far away from a bottom of the first accommodation groove, of the support kit and a top surface, far away from a bottom of the second accommodation groove, of the clamping kit are in a same horizontal plane, and are in a same horizontal plane as a surface of a wall of the housing in which the first and second accommodation grooves are located.

In a ninth possible implementation manner of the second aspect, the housing includes a bottom wall, a top wall, and a side wall connecting the top wall and the bottom wall, and the top wall, the bottom wall, and the side wall enclose to form accommodation space; the photographing unit includes a camera, a processor, and a transmission unit, the camera is disposed on the side wall, so as to capture a picture, the processor is disposed in the accommodation space, so as to process the captured picture, and the transmission unit is disposed in the accommodation space, so as to output the processed picture to the mobile terminal body; the first mounting kit is disposed on an outer surface of the bottom wall, so as to be detachably mounted on the mobile terminal body; and the support is disposed on the side wall and is disposed opposite to the camera.

With reference to the ninth possible implementation manner of the second aspect, in a tenth possible implementation manner, the mobile terminal body includes a casing and a receiving unit, a top of the casing is provided with a second mounting kit, so as to cooperate with the first mounting kit, so that the camera assembly is detachably mounted on the top of the casing, and the receiving unit is connected to the transmission unit, so as to receive the processed picture transmitted by the transmission unit.

In an eleventh possible implementation manner of the second aspect, the first mounting kit is symmetrical with respect to a central axis of the camera assembly, and the second mounting kit is symmetrical with respect to the central axis of the camera assembly.

In the present invention, the camera assembly includes a housing, a photographing unit, and a mounting kit, where the photographing unit is disposed in the housing and is configured to capture a picture and transmit the captured picture to the mobile terminal body, and the mounting kit is disposed on the housing and is configured to be detachably mounted on the mobile terminal body, so as to detachably mount the camera assembly to the mobile terminal body. Therefore, when the camera assembly is not mounted on the mobile terminal body, the camera assembly can be placed at any place to take a photo, which improves convenience and flexibility of photo taking and resolves a problem that photo taking is limited by ambient environment and a shooting angle because an existing camera assembly has only a single height and angle

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
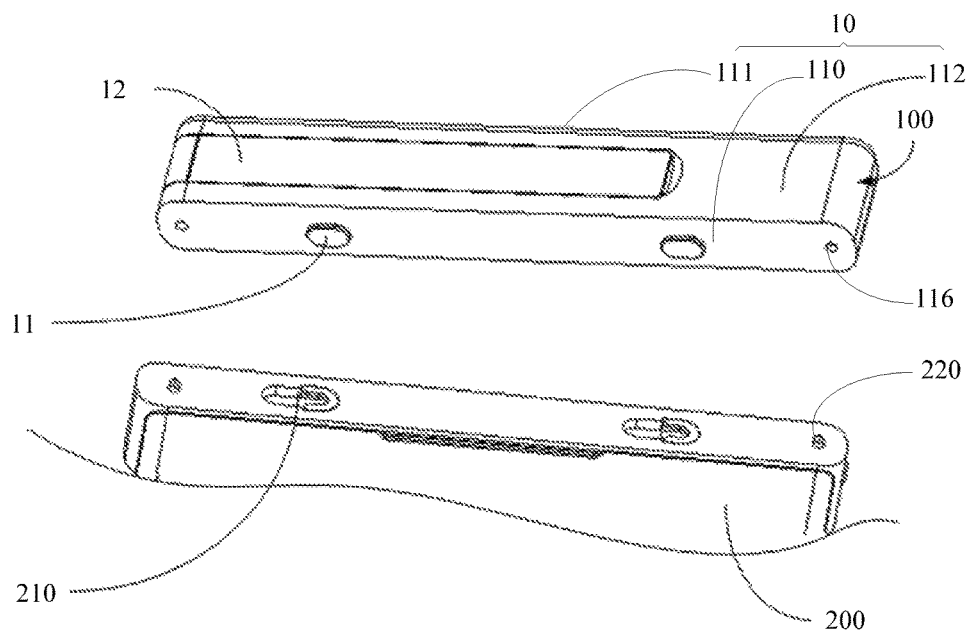
FIG. 1 is a schematic diagram in which a camera assembly provided in a first implementation manner of the present invention is not mounted on a mobile terminal body.

Refer to FIG. 1, which shows a camera assembly 100 provided in a first implementation manner of the present invention. The camera assembly 100 is configured to be detachably mounted on a mobile terminal body 200. The camera assembly 100 includes a housing 10, a photographing unit, and a mounting kit 11. The photographing unit is disposed in the housing 10 and is configured to capture a picture and transmit the captured picture to the mobile terminal body 200. The mounting kit 11 is disposed on the housing 10 and is configured to be detachably mounted on the mobile terminal body 200, so as to detachably mount the camera assembly 100 to the mobile terminal body 200.

In this implementation manner, the camera assembly 100 includes the mounting kit 11. The mounting kit 11 is disposed on the housing 10 and is configured to be detachably mounted on the mobile terminal body 200, so as to detachably mount the camera assembly 100 to the mobile terminal body 200. According to the present invention, convenience and flexibility of photo taking are improved, thereby resolving a problem that a photographing scenario and a shooting angle are limited.

Further, the mounting kit 11 is symmetrical with respect to a central axis of the housing 10. The mounting kit 210 is symmetrical with respect to the central axis of the housing 10. Therefore, it can be ensured that the camera assembly 100 not only can be inserted into the mobile terminal body 200 from the front side, but also can be inserted into the mobile terminal body 200 from the back side, that is, an orientation of a camera of the camera assembly 100 is opposite to an orientation of a display of the mobile terminal body, or an orientation of a camera of the camera assembly 100 is the same as an orientation of a display of the mobile terminal body.

In this implementation manner, the mounting kit 11 may be two projections. The two projections are symmetrical to each other with respect to a central axis of the camera assembly 100. Correspondingly, the mobile terminal body 200 is provided with the mounting kit 210, for example, two clamping slots that are symmetrical to each other with respect to the central axis of the camera assembly 100, and the clamping slots are configured to be detachably clamped and fastened to corresponding projections, so as to detachably mount the camera assembly 100 to the mobile terminal body 200.

Specifically, when the camera assembly 100 is mounted on the mobile terminal body 200, a projection is placed on a relatively wide side of a clamping slot, and the projection is slid, so as to slide the projection to a relatively narrow side of the clamping slot. When the projection slides to the relatively narrow side of the clamping slot, an interference fit exists between the projection and the relatively narrow side of the clamping slot, so as to clamp the projection to the relatively narrow side of the clamping slot. When it is required to detach the camera assembly 100 from the mobile terminal body 200, the camera assembly 100 is pushed, so as to move the projection to the relatively wide side of the clamping slot. When the projection is moved to the relatively wide side of the clamping slot, the camera assembly 100 is lifted up, so as to detach the camera assembly 100 from the mobile terminal body 200. In the implementation manner, the relatively narrow sides of the clamping slots are symmetrical with respect to a middle axis of the camera assembly 100. Therefore, when the mounting kit 11 is mounted on the mobile terminal body 200, portions, in which the mounting kit 11 is located, on the mounting kit 210 are symmetric relative to the middle axis of the camera assembly 100.

In another implementation manner, the mounting kit 11 may also be another structure or another kit as long as it is ensured that the camera assembly 100 can be detachably mounted on the mobile terminal body 200. For example, the mounting kit 11 may be a first magnetic part, the mobile terminal body 200 is correspondingly provided with a second magnetic part, and the camera assembly 100 is detachably mounted on the mobile terminal body 200 by using magnetic attraction between the first magnetic part and the second magnetic part. Quantities of the mounting kits 11 and the mounting kits 210 may be adjusted according to an actual requirement as long as it is ensured that the mounting kits 11 and the mounting kits 210 can be separately symmetrical with respect to the central axis of the housing 10.

Further, the housing 10 includes a bottom wall no, a top wall in, and a side wall 112 connecting the top wall in and the bottom wall no. The top wall in, the bottom wall no, and the side wall 112 enclose to form accommodation space. The photographing unit includes a camera 113 (referring to FIG. 3) and a transmission unit. The camera 113 is disposed on the side wall 112, so as to be configured to capture a picture. The transmission unit is disposed in the accommodation space, so as to output the captured picture to the mobile terminal body 200. The mounting kit 11 is disposed on an outer surface of the bottom wall no, so as to be detachably mounted on the mobile terminal body 200. The camera assembly is provided with a power source, and the power source is disposed in the accommodation space, to supply power to the camera.

In this implementation manner, the bottom wall no is detachably (for example, clamped to) fastened to a bottom of the side wall 112. The top wall in and the side wall 112 are integrally formed. In another implementation manner, the top wall in may also be detachably (for example, clamped to) fastened to a top of the side wall 112. The bottom no and the side wall 112 may also be integrally formed. The side wall 112 may also be a detachable structure. For example, the side wall includes a front wall and a back wall, and the front wall and the back wall are fastened to each other in a detachable manner and form the accommodation space with the top wall no and the bottom wall no. In addition, the bottom wall no is provided with a positioning hole 116. The mobile terminal body 200 is correspondingly provided with a positioning block 220, so that the positioning block 220 cooperates with the positioning hole 116, so as to position the camera assembly 100.

It should be noted that, the camera assembly 100 may also independently process the picture captured by the camera. For example, the camera assembly 100 may also include a processing unit, which is configured to process the picture captured by the camera and output the processed picture to the transmission unit, so that the output unit transmits the processed picture to the mobile terminal body 200. In addition, a manner of positioning the camera assembly 100 and the mobile terminal body 200 may also be adjusted according to an actual requirement, and is not limited to a positioning manner in which the positioning hole 116 and the positioning block 200 cooperate.

The camera assembly 100 may further include a first group of connection contacts (not shown), which are connected to a second group of connection contacts (not shown) of the mobile terminal body 200, so that the camera assembly 100 and the mobile terminal body 200 perform data transmission, for example, image transmission.

Figure 2:
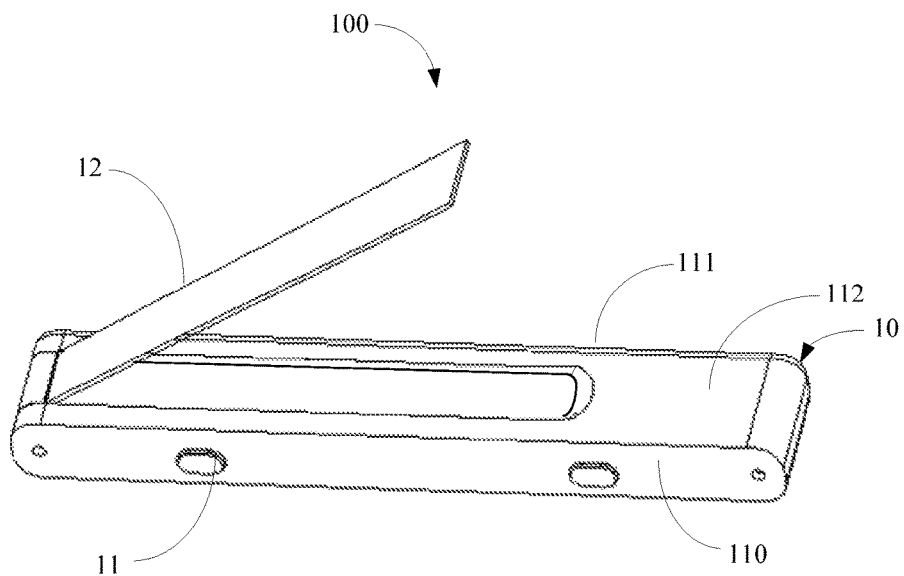
FIG. 2 is a schematic diagram of a state of a camera assembly provided in the first implementation manner of the present invention.

Continue to refer to FIG. 2, and further, the camera assembly 100 further includes a support 12. The support 12 is disposed on the housing 10 in a rotatably positioned manner, so as to support the housing 10, and a direction in which and a position at which the camera assembly 100 is supported are changed by rotating the support 10.

When the camera assembly 100 is not mounted on the mobile terminal body 200, supported by the support 12, the camera assembly 100 may be placed at any place, and a height and an angle at which the support 12 supports the camera assembly 100 may be changed by rotating the support 12, which resolves a problem that photo taking is limited by ambient environment and a shooting angle because an existing camera assembly has only a single height and angle.

The support 12 may be disposed on the side wall 110 and is disposed opposite to the camera 113.

Figure 3:
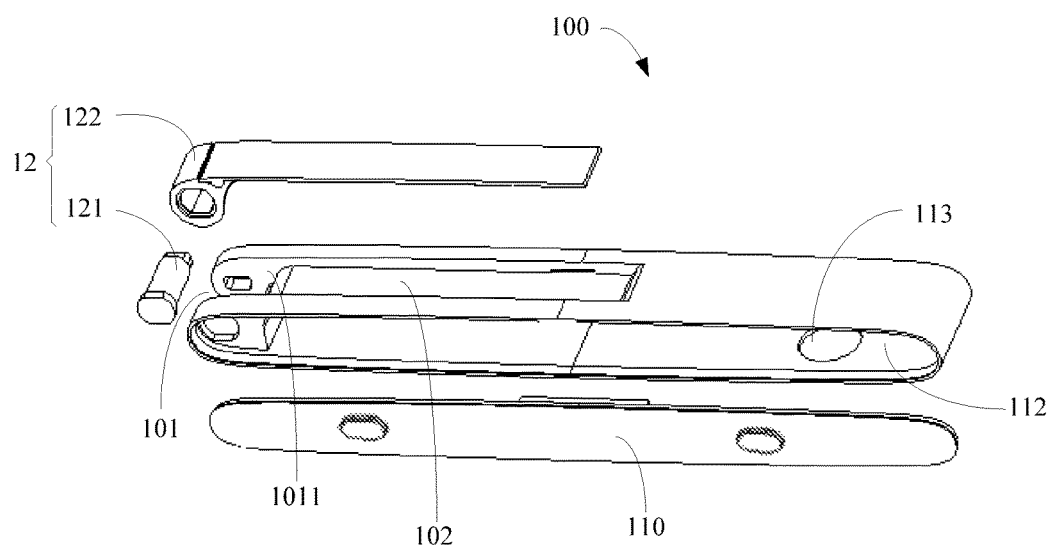
FIG. 3 is a partial exploded view of a camera assembly provided in the first implementation manner of the present invention.

Continue to refer to FIG. 3, and specifically, the support 12 includes a rotating shaft 121 and a support kit 122. The support kit 122 is disposed on the rotating shaft 121 in a rotatably positioned manner. The housing 10 is provided with an opening 101 and an accommodating groove 102 connected to the opening 101. Two ends of the rotating shaft 121 are fastened to opposite inner walls 1011 of the opening 101. The support kit 122 is rotatable to be accommodated in or separated from the accommodating groove 102.

When the camera assembly 100 is mounted on the mobile terminal body 200, the support 12 does not need to be used temporarily, and the support 12 may be accommodated in the accommodating groove 102. When the camera assembly 100 is detached from the mobile terminal body 200 to take a photo, the camera assembly 100 needs to be supported. By rotating the support 12, the support 12 may be rotated out from the accommodating groove 10, and the housing 10 of the camera assembly 100 is supported at a proper position. Moreover, the housing 10 may be supported by rotating the support 12 by different angles, so as to position the camera assembly 100 at different heights and angles.

Figure 4:
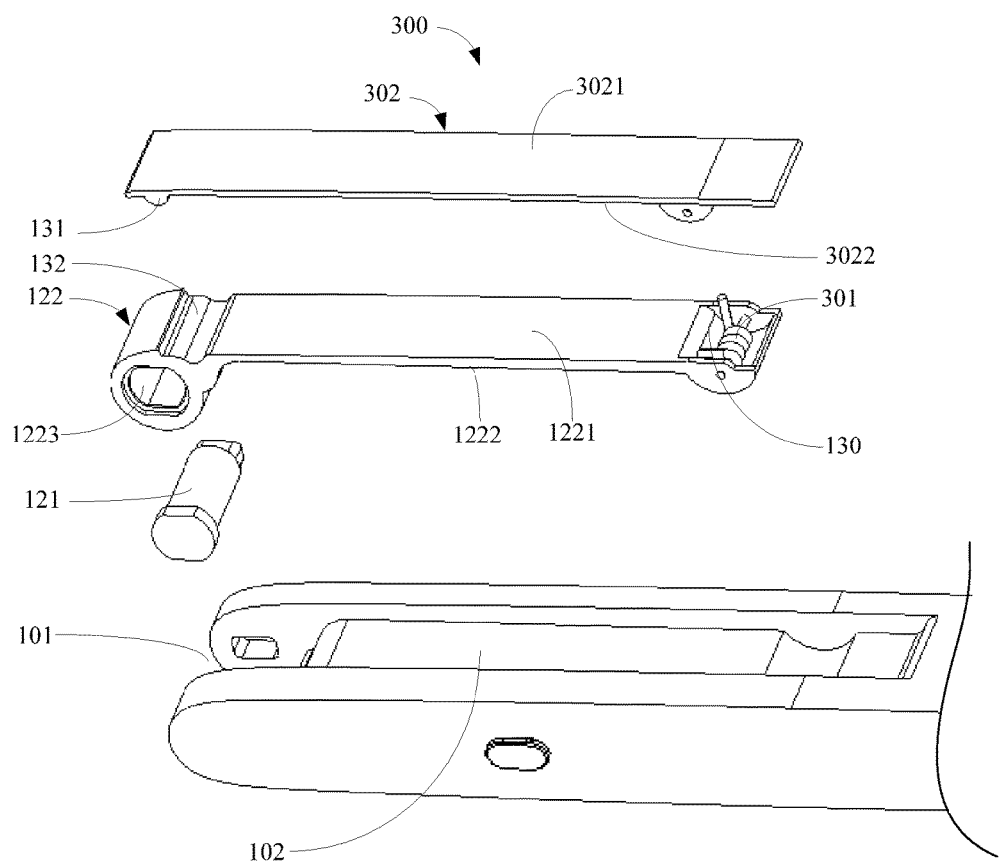
FIG. 4 is a partial exploded view of a camera assembly provided in a second implementation manner of the present invention.
Figure 5:
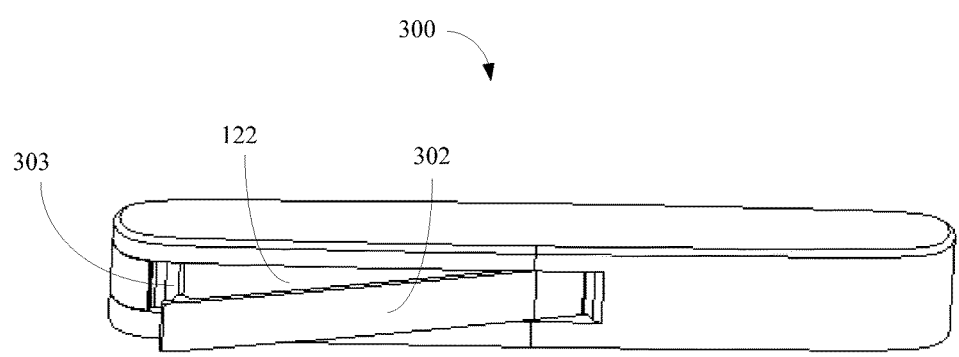
FIG. 5 is a schematic diagram of a state of a camera assembly provided in the second implementation manner of the present invention.

Continue to refer to FIG. 4 and FIG. 5, which are a camera assembly 300 provided in a second implementation manner of the present invention. The camera assembly 300 provided in the second implementation manner is similar to the camera assembly 100 provided in the first implementation manner. A difference thereof lies in that, in the second implementation manner, the camera assembly 300 further includes an elastic kit 301 and a clamping kit 302. The clamping kit 302 is disposed on the housing 10 by using the elastic kit 301, so as to clamp a to-be-clamped object between the clamping kit 302 and the housing 10.

Specifically, the elastic kit 301 and the clamping kit 302 are both disposed on the support kit 122. A first end of the support kit 122 is sleeved on the rotating shaft 121 in a rotatably positioned manner. A first end of the clamping kit 302 is connected to a second end of the support kit 122 by means of the elastic kit 301 in a rotatable manner. A second end of the clamping kit 302 is in conformal contact with the support kit 122. When a force is applied to the first end of the clamping kit 302, the second end of the clamping kit 302 moves in a direction far away from the support kit 122. The elastic kit 301 is deformed and generates a restoring force. First clamping space 303 is formed between the second end of the clamping kit 302 and the support kit 122, so as to accommodate the to-be-clamped object. When application of a force to the first end of the clamping kit 302 ends, the second end of the clamping kit 302 moves towards the support kit 122 under the action of the restoring force, so that the to-be-clamped object is clamped between the support kit 122 and the clamping kit 302.

In this implementation manner, the clamping kit 302 has a top surface 3021 and a bottom surface 3022 that are oppositely disposed. The support kit has a first surface 1221 and a second surface 1222 that are oppositely disposed. The bottom surface 3022 corresponds to the first surface 1221 of the support kit 122. The second surface 1222 of the support kit 122 faces the housing 10. When the elastic kit 301 is in a natural state, the bottom surface 3022 of the clamping kit 302 is in conformal contact with the first surface 1221.

Further, the first end of the support kit 122 is provided with a shaft hole 1223. The shaft hole 1223 has a damping force inside, and the damping force is even. The shaft hole 1223 is sleeved on the rotating shaft 121. Under the action of the damping force, the shaft hole 1223 and the rotating shaft 121 rotate and are positioned relative to each other, so that the support 12 may be rotated and positioned at any angle. The rotating shaft 121 may also be a damping rotating shaft. A rotatable angle for the support 12 is preferably 0 to 310 degrees. In another implementation manner, the rotatable angle for the support 12 may be adjusted according to an actual requirement. To enable the shaft hole 1223 and the rotating shaft 121 to rotate and be positioned relative to each other, another manner, for example, a manner in which a fastener and a groove cooperate with each other may also be used.

Specifically, the elastic kit 301 is a rotary spring. The first surface 1221, which faces the clamping kit 302, of the second end of the support kit 122 is provided with a fastening groove 130. The rotary spring is fastened in the fastening groove 130. A first end of the rotary spring abuts on an inner wall of the fastening groove 130. A second end of the rotary spring is fastened to the first end of the clamping kit 302. When the rotary spring is in a natural state, the second end of the clamping kit 302 is in conformal contact with the first surface 1224 of the support kit 122. When the clamping space 303 is formed between the second end of the clamping kit 302 and the first end of the support kit 122, the rotary spring is in an elastically deformed state and has a restoring force.

Further, the bottom surface 3022, which faces the support kit 122, of the second end of the clamping kit 302 is provided with a reinforcement portion 131. A portion, close to the first end of the support kit 122, of the first surface 1224 of the support kit 122 caves in to form a groove 132, to correspond to the reinforcement portion 131. When the second end of the clamping kit 302 is in conformal contact with the support kit 122, the reinforcement portion 131 is accommodated in the groove 132. A function of the reinforcement portion 131 is: when a to-be-clamped object is clamped between the clamping kit 302 and the support kit 122, the reinforcement portion 131 is used to increase a clamping strength, so that the to-be-clamped object can be clamped firmly.

Figure 6:
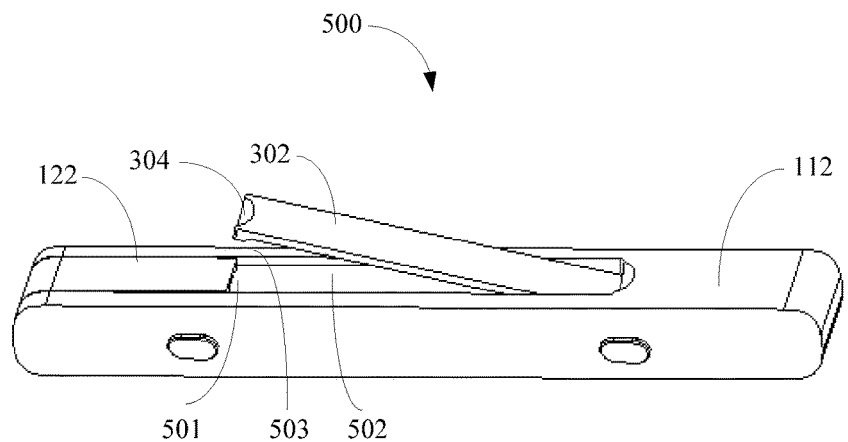
FIG. 6 is a schematic diagram of a camera assembly provided in a third implementation manner of the present invention.

Continue to refer to FIG. 6, which shows a camera assembly 500 provided in a third implementation manner of the present invention. The camera assembly 500 provided in the third implementation manner is similar to the camera assembly 100 provided in the second implementation manner. A difference thereof lies in that, in the third implementation manner, the accommodating groove includes a first accommodation groove 501 and a second accommodation groove 502, where the opening 101, the first accommodation groove 501, and the second accommodation groove 502 are sequentially go-through. The support kit 122 is accommodated in the first accommodation groove 501. A first end of the elastic kit 301 is fastened to a first end, far away from the opening 101, of the second accommodation groove 502. A second end of the elastic kit 301 is connected to the first end of the clamping kit 302. The second end of the clamping kit 302 is located at a second end, close to the opening 101, of the second accommodation groove 502. When the elastic kit 301 is in a natural state, the clamping kit 302 is accommodated in the second accommodation groove 502. When a force is applied to the first end of the clamping kit 302, the second end of the clamping kit 302 moves in a direction far away from the second accommodation groove 502. The elastic kit 301 is deformed and generates a restoring force. Second clamping space 503 is formed between the second end of the clamping kit 302 and the housing 10, so as to accommodate the to-be-clamped object. When application of a force to the first end of the clamping kit 302 ends, the second end of the clamping kit 302 folds towards the second accommodation groove 502 under the action of the restoring force, so that the to-be-clamped object is clamped between the housing 10 and the clamping kit 302.

Specifically, the opening 101 is disposed on an end portion of the housing 10. When the support kit 122 and the clamping kit 302 are accommodated respectively in the first accommodation groove 501 and the second accommodation groove 502, the first surface 1221, far away from a bottom of the first accommodation groove 501, of the support kit 122 and the top surface 3021, far away from a bottom of the second accommodation groove 502, of the clamping kit 302 are in a same horizontal plane, and are in a same horizontal plane as a surface of a wall of the housing 10 in which the first and second accommodation grooves 501 and 502 are located. Therefore, the camera assembly 500 has no redundant edges and corners and is convenient to be carried and mounted, and has a beautiful appearance.

Further, the second end of the clamping kit 302 is provided with a lifting slot 304, so as to lift the clamping kit 302 by using the lifting slot 304. Therefore, it is convenient in use.

Figure 7:
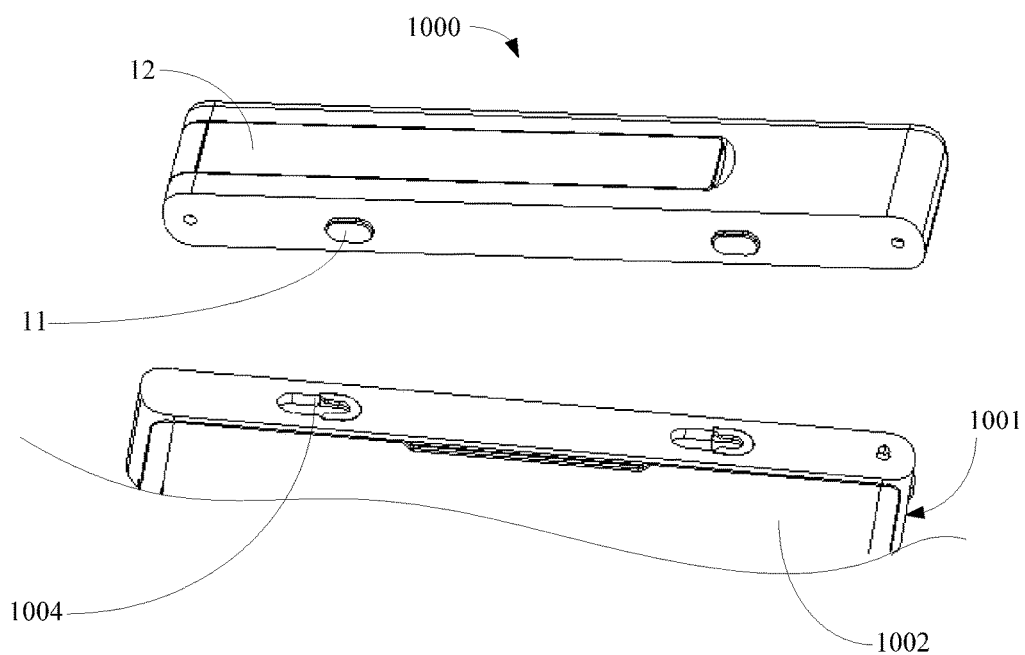
FIG. 7 shows a mobile terminal provided in a fourth implementation manner of the present invention.

Refer to FIG. 7, which shows a mobile terminal 1000 provided in a fourth implementation manner of the present invention. The mobile terminal includes a mobile terminal body 1001 and a camera assembly. The camera assembly is detachably mounted on the mobile terminal body 1001. The camera assembly may be any one of the camera assemblies provided in the foregoing implementation manners. Because a structure of the camera assembly and a relationship between the camera assembly and the mobile terminal body 1001 are described in detail in the foregoing implementation manners, details are not described herein again.

It should be noted that, the mobile terminal body 1001 includes a casing 1002 and a receiving unit (not shown). A top of the casing 1002 is provided with a mounting kit 1004, so as to cooperate with the mounting kit 11, so that the camera assembly is detachably mounted on the top of the casing 1002. The receiving unit is connected to a transmission unit of the camera assembly, so as to receive a processed picture transmitted by the transmission unit.

In this implementation manner, the mobile terminal 1000 includes a mobile terminal body 1001 and a camera assembly that is detachably mounted on the mobile terminal body 1001. When the camera assembly is not mounted on the mobile terminal body 1001, supported by the support 12, the camera assembly may be placed at any place, and a height and an angle at which the support 12 supports the camera assembly may be changed by rotating the support 12, which resolves a problem that photo taking is limited by ambient environment and a shooting angle because an existing camera assembly has only a single height and angle.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that the descriptions are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A camera assembly, comprising:
    a housing;
    a photographing unit; and
    a mounting kit;
    wherein the photographing unit is disposed in the housing and is configured to capture a picture and to transmit the captured picture to a mobile terminal body; and
    wherein the mounting kit is disposed on the housing and is configured to be detachably mounted on the mobile terminal body, so as to detachably mount the camera assembly to the mobile terminal body, wherein the mounting kit is symmetrical with respect to a central axis of the camera assembly, wherein the mounting kit is configured to allow the camera assembly to be detachably mounted to the mobile terminal body in a manner that an orientation of the camera assembly is the same as an orientation of a display of the mobile terminal body, and wherein the mounting kit is configured to allow the camera assembly to be detachably mounted to the mobile terminal body in a manner that the orientation of the camera assembly is opposite to the orientation of the display of the mobile terminal body;
    wherein the camera assembly further comprises a support, and the support is disposed on the housing in a rotatably positioned manner, wherein the support is configured to support the housing and to change, by rotating the support, a direction in which and a position at which the camera assembly is supported;
    wherein the support comprises:
    a rotating shaft; and
    a support kit, wherein the support kit is disposed on the rotating shaft in a rotatably positioned manner;
    wherein housing is provided with an opening and an accommodating groove connected to the opening, two ends of the rotating shaft are fastened to opposite inner walls of the opening, and the support kit is rotatable to be accommodated in or separated from the accommodating groove;
    wherein the camera assembly further comprises:
    an elastic kit; and
    a clamping kit, wherein the clamping kit is disposed on the housing using the elastic kit, so as to clamp a to-be-clamped object between the clamping kit and the housing;
    wherein the elastic kit and the clamping kit are both disposed on the support kit;
    wherein a first end of the support kit is sleeved on the rotating shaft in a rotatably positioned manner;
    wherein a first end of the clamping kit is connected to a second end of the support kit by means of the elastic kit in a rotatable manner, and a second end of the clamping kit is in conformal contact with the support kit; and
    wherein the camera assembly is configured so that when a force is applied to the first end of the clamping kit, the second end of the clamping kit is configured to moves in a direction far away from the support kit, the elastic kit is deformed and generates a restoring force, and a first clamping space is formed between the second end of the clamping kit and the support kit, so as to accommodate the to-be-clamped object; and when application of the force applied to the first end of the clamping kit ends, the second end of the clamping kit moves towards the support kit under the action of the restoring force, so that the to-be-clamped object is clamped between the support kit and the clamping kit.

2. The camera assembly according to claim 1, wherein the elastic kit is a rotary spring;
    wherein a first surface, which faces the clamping kit, of the second end of the support kit is provided with a fastening groove;
    wherein the rotary spring is fastened in the fastening groove, a first end of the rotary spring abuts on an inner wall of the fastening groove, and a second end of the rotary spring is fastened to the first end of the clamping kit; and wherein the camera assembly is configured so that when the rotary spring is in a natural state, the second end of the clamping kit is in conformal contact with the first surface of the support kit, and when the first clamping space is formed between the second end of the clamping kit and the support kit, the rotary spring is in an elastically deformed state and has a restoring force.

3. The camera assembly according to claim 1, wherein a bottom surface, which faces the support kit, of the second end of the clamping kit is provided with a reinforcement portion;

wherein a surface, which faces the clamping kit, of the support kit is provided with a groove, to correspond to the reinforcement portion; and wherein the camera assembly is configured so that when the second end of the clamping kit is in conformal contact with the support kit, the reinforcement portion is accommodated in the groove.

4. The camera assembly according to claim 1, wherein the accommodating groove comprises a first accommodation groove and a second accommodation groove, and the opening, the first accommodation groove, and the second accommodation groove are sequentially go-through;

wherein the support kit is accommodated in the first accommodation groove, and a first end of the elastic kit is fastened to a first end, distal from the opening, of the second accommodation groove;

wherein a second end of the elastic kit is connected to the first end of the clamping kit, and the second end of the clamping kit is located at a second end, close to the opening, of the second accommodation groove; and wherein the camera assembly is configured so that, when the elastic kit is in a natural state, the clamping kit is accommodated in the second accommodation groove, when a force is applied to the first end of the clamping kit, the second end of the clamping kit moves in a direction far away from the second accommodation groove, and the elastic kit is deformed and generates a restoring force, and second clamping space is formed between the second end of the clamping kit and the housing, so as to accommodate the to-be-clamped object, and when application of a force to the first end of the clamping kit ends, the second end of the clamping kit folds towards the second accommodation groove under the action of the restoring force, so that the to-be-clamped object is clamped between the housing and the clamping kit.

5. The camera assembly according to claim 4, wherein the opening is disposed on an end portion of the housing; and wherein the camera assembly is configured so that when the support kit and the clamping kit are respectively accommodated in the first accommodation groove and the second accommodation groove, a first surface, distal from a bottom of the first accommodation groove, of the support kit and a top surface, distal from a bottom of the second accommodation groove, of the clamping kit are in a same horizontal plane, and are in a same horizontal plane as a surface of a wall of the housing in which the first and second accommodation grooves are located.

6. The camera assembly according to claim 4, wherein the second end of the clamping kit is provided with a lifting slot, and wherein the camera assembly is configured to lift the clamping kit using the lifting slot.

7. The camera assembly according to claim 1, wherein the housing comprises a bottom wall, a top wall, and a side wall connecting the top wall and the bottom wall, and the top wall, the bottom wall, and the side wall enclose to form accommodation space;

wherein the photographing unit comprises a camera, a processor, and a transmitter, the camera is disposed on the side wall, so as to capture a picture, the processor is disposed in the accommodation space, so as to process the captured picture, and the transmitter is disposed in the accommodation space, so as to output the processed picture to the mobile terminal body; and wherein the mounting kit is disposed on an outer surface of the bottom wall, so as to be detachably mounted on the mobile terminal body.

8. A mobile terminal, comprising:

a mobile terminal body; and a camera assembly that is detachably disposed on the mobile terminal, wherein the camera assembly comprises:

a housing;

a support;

an elastic kit;

a clamping kit;

a photographing unit; and a first mounting kit;

wherein the photographing unit is disposed in the housing and is configured to capture a picture and transmit the captured picture to the mobile terminal body;

wherein the first mounting kit is disposed on the housing and is configured to be detachably mounted on the mobile terminal body, so as to detachably mount the camera assembly to the mobile terminal body;

wherein the support is disposed on the housing in a rotatably positioned manner, wherein the support is configured to support the housing and to change, by rotating the support, a direction in which and a position at which the camera assembly is supported; and wherein the elastic kit and the clamping kit are disposed on the support;

wherein the support comprises a rotating shaft and a support kit, and the support kit is disposed on the rotating shaft in a rotatably positioned manner; and wherein the housing is provided with an opening and an accommodating groove connected to the opening, two ends of the rotating shaft are fastened to opposite inner walls of the opening, and the support kit is rotatable to be accommodated in or separated from the accommodating groove;

wherein the clamping kit is disposed on the support using the elastic kit, and configured to clamp a to-be-clamped object between the clamping kit and the housing;

wherein a first end of the support kit is sleeved on the rotating shaft in a rotatably positioned manner;

wherein a first end of the clamping kit is connected to a second end of the support kit by means of the elastic kit in a rotatable manner, and a second end of the clamping kit is in conformal contact with the support kit; and wherein the camera assembly is configured in a manner that, when a force is applied to the first end of the clamping kit, the second end of the clamping kit moves in a direction far away from the support kit, the elastic kit is deformed and generates a restoring force, and first clamping space is formed between the second end of the clamping kit and the support kit, so as to accommodate the to-be-clamped object, and when application of a force to the first end of the clamping kit ends, the second end of the clamping kit moves towards the support kit under the action of the restoring force, so that the to-be-clamped object is clamped between the support kit and the clamping kit.

9. The mobile terminal according to claim 8, wherein the elastic kit is a rotary spring;
wherein a first surface, which faces the clamping kit, of the second end of the support kit is provided with a fastening groove, the rotary spring is fastened in the fastening groove, a first end of the rotary spring abuts on an inner wall of the fastening groove, and a second end of the rotary spring is fastened to the first end of the clamping kit; and
wherein when the rotary spring is in a natural state, the second end of the clamping kit is in conformal contact with the first surface of the support kit, and when the first clamping space is formed between the second end of the clamping kit and the support kit, the rotary spring is in an elastically deformed state and has a restoring force.

10. The mobile terminal according to claim 8, wherein the mobile terminal body comprises a casing and a receiver; and
wherein a top of the casing is provided with a second mounting kit, so as to cooperate with the first mounting kit, so that the camera assembly is detachably mounted on the top of the casing, and the receiver is connected to a transmitter, so as to receive a processed picture transmitted by the transmitter.

11. The mobile terminal according to claim 10, wherein the first mounting kit is symmetrical with respect to a central axis of the camera assembly, and the second mounting kit is symmetrical with respect to the central axis of the camera assembly.

* * * * *